United States Patent [19]
Riley

[11] 4,409,962
[45] Oct. 18, 1983

[54] WATER STORAGE TANK

[75] Inventor: Harry J. Riley, Wembley, Australia

[73] Assignee: S.W. Hart & Co. Pty. Ltd., Welshpool, Australia

[21] Appl. No.: 283,698

[22] Filed: Jul. 15, 1981

Related U.S. Application Data

[63] Continuation of Ser. No. 98,416, Nov. 28, 1979, abandoned.

[30] Foreign Application Priority Data

Sep. 5, 1979 [JP] Japan .............................. 54-114022

[51] Int. Cl.³ .............................................. F24J 3/02
[52] U.S. Cl. .................................. 126/437; 126/400; 165/135
[58] Field of Search ............... 126/430, 436, 437, 400; 165/18, 135, 136

[56] References Cited

U.S. PATENT DOCUMENTS

| | | | |
|---|---|---|---|
| 1,753,227 | 4/1930 | Wheeler et al. | 126/437 |
| 2,553,073 | 5/1951 | Barnett | 126/437 |
| 4,008,709 | 2/1977 | Jardine | 126/400 |
| 4,083,490 | 4/1978 | Cunningham et al. | 126/437 |
| 4,122,830 | 10/1978 | Hapgood | 126/437 |
| 4,139,055 | 2/1979 | Thomason et al. | 126/400 |
| 4,153,043 | 5/1979 | Goolsby | 126/437 |
| 4,153,104 | 5/1979 | Ruper | 126/437 |
| 4,158,358 | 6/1979 | Thomason et al. | 126/437 |
| 4,165,732 | 8/1979 | Morin | 126/437 |
| 4,213,448 | 7/1980 | Hebert | 126/437 |

*Primary Examiner*—Daniel J. O'Connor
*Attorney, Agent, or Firm*—Pollock, Vande Sande & Priddy

[57] ABSTRACT

The present invention relates to a cylindrical water storage tank for a solar water heater which tank is entirely surrounded by a layer of insulating material, said cylindrical tank being arranged to be horizontally disposed in use and having water outlet means in an upper region thereof and water inlet means in a lower region thereof, wherein the portion of the insulating layer surrounds the upper region of the cylindrical tank is thicker than the portion of the insulating layer which surrounds the lower region of the tank. The use of thicker insulation in the upper region of the tank provides good insulation under night time conditions for the region of the tank usually containing hot water. Thinner insulation in the lower region of the tank enables heat to be lost from the tank under stagnation conditions.

3 Claims, 1 Drawing Figure

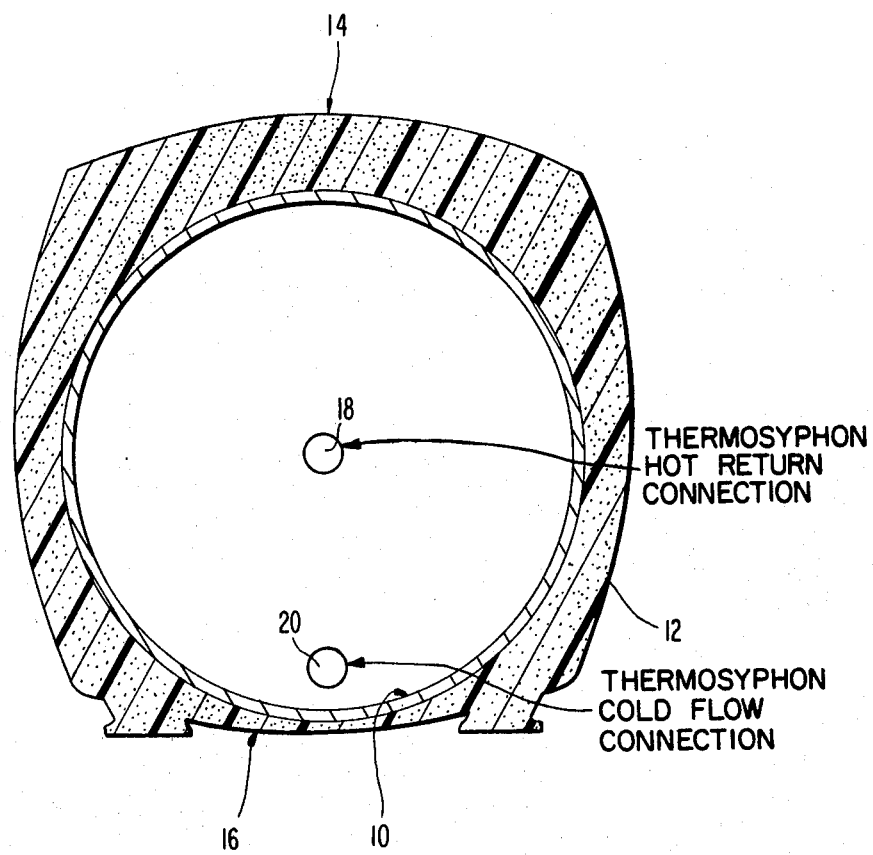

WATER STORAGE TANK

This is a continuation of application Ser. No. 098,416, filed Nov. 28, 1979 now abandoned.

The present invention relates to a water storage tank which is of particular use in solar water heaters.

In solar water heaters comprising a water storage tank it is essential that heat losses be minimized. It has been found that foamed polyurethane insulation provides a good material for this purpose.

With a horizontal storage vessel in a domestic solar water heater, when hot water is drawn from the tank, cold water enters the bottom of the tank and lies along the bottom in a stratified manner below the hot water contents of the tank. Under normal conditions of use, following a day of exposure to solar radiation, the tank is full of hot water. Evening water usage causes about one third of the tank volume to be drawn off and this quantity of hot water is replaced by cold water lying along the bottom of the tank. Heat loss is proportional to the temperature difference between two surfaces and so, where insulation of equal thickness is used for all parts of the tank the heat loss from the upper two thirds of the container is much greater than that from the lower one third.

Also, in a thermosyphon type solar hot water system, under conditions of non-use, where the tank is left to stagnate, the water reaches its highest equilibrium temperature. Under these circumstances the tank may still be full of hot water at the end of the night or non-solar period. High stagnation temperatures lead to accelerated breakdown of container materials, fouling of collector ways, tripping of auxiliary heater safety cut-outs and temperature operated relief valves. The present invention provides an insulated water storage tank for a solar water heater which overcomes the above disadvantages. In accordance with the present invention, there is provided a cylindrical water storge tank for a solar water heater which tank is entirely surrounded by a layer of insulating material, said cylindrical tank being arranged to be horizontally disposed in use and having water outlet means in an upper region thereof and water inlet means in a lower region thereof, wherein the portion of the insulating layer which surrounds the upper region of the cylindrical tank is thicker than the portion of the insulating layer which surrounds the lower region of the tank. The use of an insulating layer of varying thickness enables good insulation to be obtained under night time conditions for the region of the tank usually containing hot water. On the other hand, thinner insulation in the lower region of the tank enables heat to be lost from the tank under stagnation conditions, thereby reducing the equilibrium temperature of the tank.

The invention will now be described by way of example with reference to the accompanying drawing, which is a schematic transverse section through a cylindrical water storage tank in accordance with the present invention.

In the drawing, there is shown a cylindrical water storage tank 10 for a thermosyphon solar water heater having a thermosyphon hot water outlet 18 in an upper region thereof and a thermosyphon cold water inlet 20 in a lower region thereof, which tank is surrounded by a layer 12 of foamed polyurethane insulating material. The layer 12 is of varying thickness and the thickness generally varies in proportion to the difference between the stored water temperature and the surrounding ambient temperature. Typically, the topmost insulation indicated at 14 has a thickness in the range from 40-80 mm, preferably 50-70 mm, such as 65 mm. Typically, the lowermost insulation indicated at 16 has a thickness in the range from 5-15 mm, such as 10 mm. The use of a cylindrical storage tank asymmetrically located within an insulating case as described herein has been found to provide effective insulation against heat losses while overcoming the problem of excessive stagnation temperature. The cylindrical water storge tank is particularly envisaged for use in conventional thermosyphon type solar water heaters. Such solar water heaters comprise a solar absorber panel having a surface arranged to be heated by impingement of solar radiation. The panel also comprises a plurality of riser tubes containing liquid. In use the panel is disposed at an angle typically facing the direction of greatest solar radiation.

Heat is transferred to the liquid in the riser tubes and the liquid in the tubes rises by convection towards the upper end of the panel. The heated water is replaced by cooler water which enters the riser tubes at their lower ends. The heated liquid may enter either an upper region of the tank itself or a jacket surrounding the tank, as described in my copending U.S. patent application No. 962,580. The cooler water is drawn from a lower region of the tank or from the jacket.

I claim:

1. In a thermosyphon solar water heater comprising a horizontally disposed cylindrical water storage tank which tank is entirely surrounded by a combined insulating and heat sink layer of foamed plastic material, said cylindrical tank having water outlet means in an upper region thereof and water inlet means in a lower region thereof, the improvement comprising the distribution of said plastic materials such that the part of said layer surrounding the upper region of said tank is thicker than the part of said layer surrounding the lower region of said tank, thereby preventing excessive heat loss from the upper region of said tank normally containing hot water, while permitting heat to be lost from said lower region of said tank under stagnation conditions, said layer having a topmost thickness in the range from 40 to 80 mm and a lowermost thickness in the range from 5 to 15 mm.

2. A thermosyphon solar water heater according to claim 1, wherein the topmost thickness of the layer of foamed plastic material is in the range from 50 to 70 mm.

3. A thermosyphon solar water heater according to claim 1, wherein the foamed plastic material is foamed polyurethane.

* * * * *